(12) United States Patent  
Yoshida et al.

(10) Patent No.: US 8,427,737 B2
(45) Date of Patent: Apr. 23, 2013

(54) ELECTROPHORETIC DISPLAY DEVICE

(75) Inventors: Motohiko Yoshida, Hino (JP); Makoto Sasaki, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 98 days.

(21) Appl. No.: 13/187,333

(22) Filed: Jul. 20, 2011

(65) Prior Publication Data

US 2012/0019896 A1    Jan. 26, 2012

(30) Foreign Application Priority Data

Jul. 22, 2010 (JP) ................................. 2010-164398

(51) Int. Cl.
*G02B 26/00* (2006.01)
*G09G 3/34* (2006.01)

(52) U.S. Cl.
USPC ........................................ 359/296; 345/107

(58) Field of Classification Search .................. 359/228, 359/245, 248, 296, 452; 345/30, 52, 83, 345/84, 98, 103–107, 205, 211; 257/59; 438/30
See application file for complete search history.

(56) References Cited

U.S. PATENT DOCUMENTS

| 7,724,234 B2 * | 5/2010 | Yoshinaga et al. ............ 345/107 |
| 8,111,449 B2 * | 2/2012 | Miyashita et al. ............. 359/296 |
| 8,154,790 B2 * | 4/2012 | Wang et al. ................... 359/296 |
| 2011/0194170 A1 * | 8/2011 | Sato .............................. 359/296 |

FOREIGN PATENT DOCUMENTS

JP    2007-272135 A    10/2007

* cited by examiner

*Primary Examiner* — Loha Ben
(74) *Attorney, Agent, or Firm* — Holtz, Holtz, Goodman & Chick, P.C.

(57) ABSTRACT

An electrophoretic display device includes: a first substrate and a second substrate which are arranged opposite to each other at a predetermined interval; a plurality of pixel electrodes which are aligned on the first substrate; a wiring which is arranged between adjacent pixel electrodes among the pixel electrodes; an opposite electrode which is provided on the second substrate; a partition wall which is provided above the wiring of the first substrate to stand toward the second substrate so as to surround the pixel electrodes; and a solvent which fills up a space surrounded by the partition wall and in which a plurality of particles are dispersed. The partition wall has a rectangular shape including four sides, at least one of which partially has an expanded-width portion wider than other portion of the at least one of the four sides.

8 Claims, 8 Drawing Sheets

ELECTROPHORETIC DISPLAY DEVICE

CROSS-REFERENCE TO RELATED APPLICATIONS

This application is based upon and claims the benefit of priority from the prior Japanese Patent Application No. 2010-164398 filed on 22 Jul. 2010, the entire contents of which are incorporated herein by reference.

BACKGROUND OF THE INVENTION

1. Field of the Invention

The present invention relates to an electrophoretic display device.

2. Description of Related Art

As an electrophoretic display device, there is conventionally known an electrophoretic display device to which an electrophoresis system of a micro partition wall structure is applied (see, Japanese Patent Application Laid-Open Publication No. 2007-272135, for example). Such electrophoretic display device has an opposite substrate which forms a display surface, and a thin film transistor substrate which is arranged opposite to the opposite substrate, for example. On an inner surface of the thin film transistor substrate, which surface is opposite to the opposite substrate, a plurality of pixel electrodes are formed to be aligned in a matrix shape. Each of the pixel electrodes is surrounded by a partition wall 100 (see FIG. 8). In the space formed by being surrounded with the opposite substrate, the thin film transistor substrate, and the partition wall 100, a solvent is filled in which multiple positively-charged black particles and negatively-charged white particles are dispersed.

If an adhesion degree between a resist 101 constituting the partition wall 100 and the thin film transistor substrate is poor when forming the partition wall 100, a lifting 102 of the resist 101 occurs as shown in FIG. 8, and thereby the resist 101 is detached from the thin film transistor substrate. As a result, a shape of the partition wall 100 gets distorted. Although one way for preventing the lifting 102 is to make the partition wall 100 thick, such way decreases the area (opening ratio) which contributes to display, and therefore there is a higher possibility that this is disadvantageous for display performance.

It is therefore an object of the present invention to prevent detachment or distortion of the partition wall while preventing a decrease of the opening ratio.

SUMMARY OF THE INVENTION

In order to solve the abovementioned problem, according to one aspect of the present invention, there is provided an electrophoretic display device including: a first substrate and a second substrate which are arranged opposite to each other at a predetermined interval; a plurality of pixel electrodes which are aligned on the first substrate; a wiring which is arranged between adjacent pixel electrodes among the pixel electrodes; an opposite electrode which is provided on the second substrate; a partition wall which is provided above the wiring of the first substrate to stand toward the second substrate so as to surround the pixel electrodes; and a solvent which fills up a space surrounded by the partition wall and in which a plurality of particles are dispersed; wherein the partition wall has a rectangular shape including four sides, at least one of which partially has an expanded-width portion wider than other portion of the at least one of the four sides.

BRIEF DESCRIPTION OF THE DRAWINGS

The present invention will sufficiently be understood by the following detailed description and accompanying drawing, but they are provided for illustration only, and not for limiting the scope of the invention.

DETAILED DESCRIPTION OF THE PREFERRED EMBODIMENTS

Figure 1:
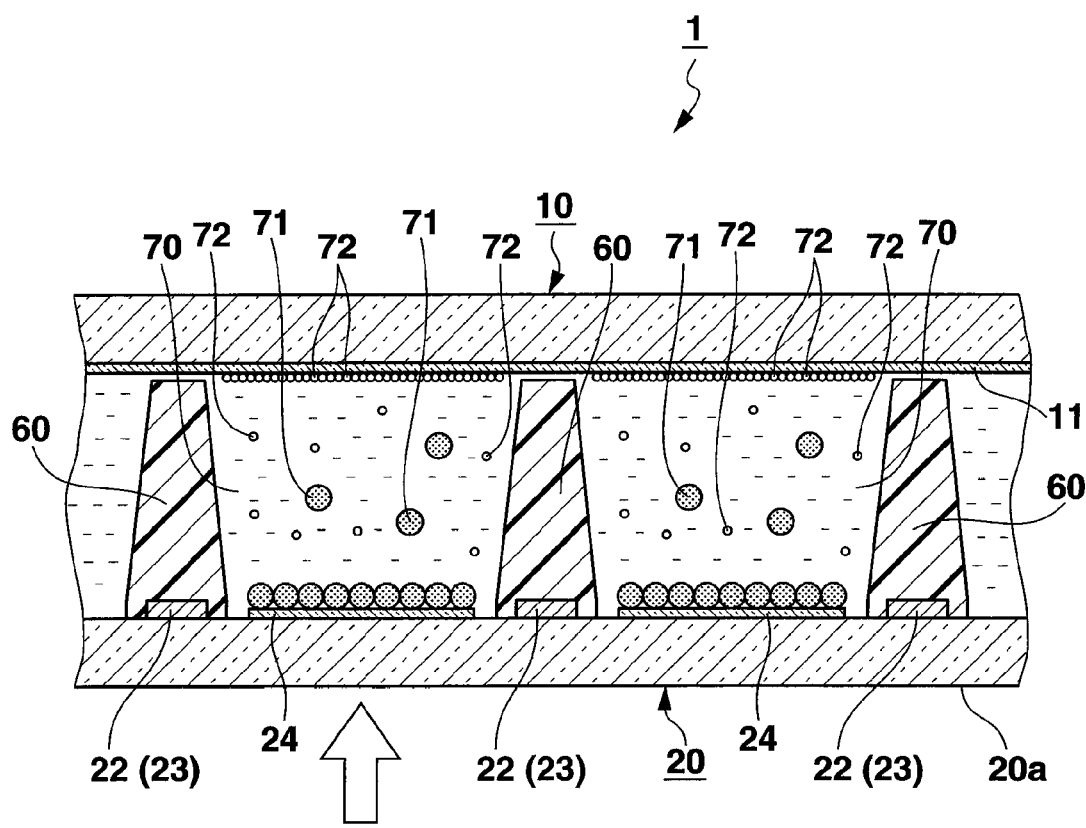
FIG. 1 is a sectional view schematically showing a main part configuration of an electrophoretic display device according to the present embodiment.

Hereinafter, a preferred embodiment of the present invention will be described below with reference to accompanying drawings. Although various limitations which are technically preferable for implementing the present invention are added to the following embodiment, the scope of the invention is not limited to the embodiment and examples shown in the drawings.

FIG. 1 is a sectional view schematically showing a main part configuration of an electrophoretic display device according to the present embodiment. As shown in FIG. 1, an electrophoretic display device 1 has an opposite substrate 10, and a thin film transistor substrate 20 which faces the opposite substrate 10 and is arranged at predetermined distance from the opposite substrate 10 via partition walls 60. The opposite substrate 10 is a second substrate and the thin film transistor substrate 20 is a first substrate. On the thin film transistor substrate 20, pixel electrodes 24 are formed in a matrix shape and scan lines 22 and data lines 23 as wirings are formed between pixel electrodes. The partition walls 60 are formed on the scan lines 22 and data lines 23 respectively so as to form a grid pattern. A frame-shaped sealing material which is not shown is formed between the opposite substrate 10 and the thin film transistor substrate 20, and spaces are formed between a pair of the substrates between which the partition walls 60 function as spacers. In each of the spaces, a solvent 70 in which black particles 71 and white particles 72 are dispersed is sealed.

The opposite substrate 10 is made of glass, for example. On an inner surface of the opposite substrate 10 facing the thin film transistor substrate 20, an opposite electrode 11 is layered. The opposite electrode 11 is made of, for example, ITO (Indium Tin Oxide).

In the solvent 70, a plurality of particles of two types having different surface polarities and colors are dispersed. One of the two types of the particles is positively-charged black particles 71, which is made from carbon for example, and the other one is negatively-charged white particles 72, which is made from $TiO_2$ (titanium oxide), for example. A diameter of each of the black particles 71 is 5.0 μm or less, and a diameter of each of the white particles 72 is 0.3 μm or less. For the solvent 70, dispersion media having a lower electric permittivity than the black particles 71 and the white particles 72 are used.

Figure 2:
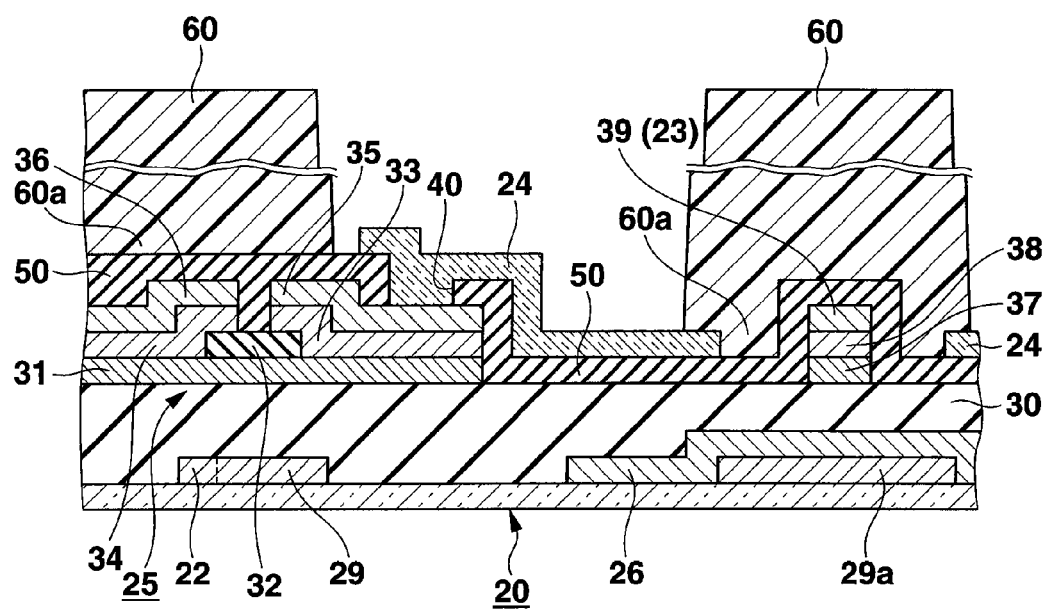
FIG. 2 is a sectional view showing a main part configuration of a thin film transistor substrate provided in the electrophoretic display device of FIG. 1, and is a sectional view seen from a section line II-II in FIG. 3.
Figure 3:
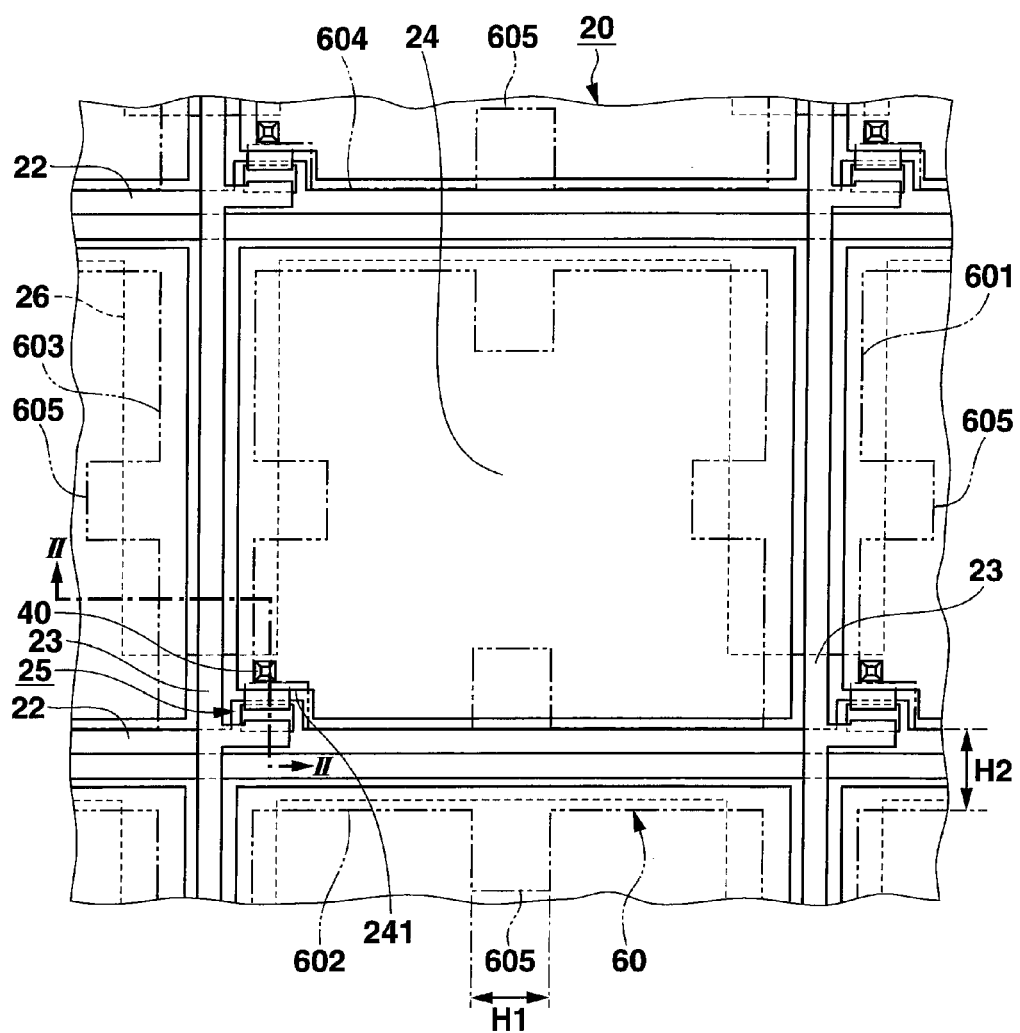
FIG. 3 is a transparent plan view showing a main part configuration of the thin film transistor substrate provided in the electrophoretic display device of FIG. 1.

Next, the thin film transistor substrate 20 will be described in detail with reference to FIGS. 2 and 3. FIG. 3 is a transparent plan view showing a main part configuration of the thin film transistor substrate 20. FIG. 2 is a sectional view seen from II-II in FIG. 3.

First, the structure of the thin film transistor substrate 20 from a plan view will be described with reference to FIG. 3. The thin film transistor substrate 20 is made of glass or the like, and a plurality of scan lines 22 and a plurality of data lines 23 are formed so as to cross with each other on an upper surface of the thin film transistor substrate 20. In this case, the scan lines 22 extend in a row direction and the data lines 23 extends in a column direction.

Further, a plurality of auxiliary capacity parts 26 are provided on the thin film transistor substrate 20. Each of the auxiliary capacity parts 26 is formed so as to overlap three sides except a lower side of each of the pixel electrodes 24 in the figure.

In each area surrounded by the scan lines 22 and data lines 23 on the thin film transistor substrate 20, each of the square-shaped pixel electrodes 24 partially having a cutout is provided. Thus, the pixel electrodes 24 are aligned in a matrix shape on the thin film transistor substrate 20. In a cutout part 241 of each of the pixel electrodes 24, a thin film transistor 25 which is a switching element is arranged. The pixel electrodes 24 are electrically connected to the scan lines 22 and data lines 23 through the thin film transistors 25.

Above the pixel electrodes 24, scan lines 22 and data lines 23, the partition walls 60 provided to stand toward the opposite substrate 10 are formed. The partition walls 60 individually separate a plurality of pixels composed of the pixel electrodes 24. When a grid pitch, namely a pixel pitch is about 100 μm to about 300 μm for example, a width of each of the partition walls 60 is preferably set to a value within a range of about 10 μm to about 40 μm, and a height of each of the partition walls 60 is preferably set to a value within a range of 10 μm to about 40 μm.

Figure 4:
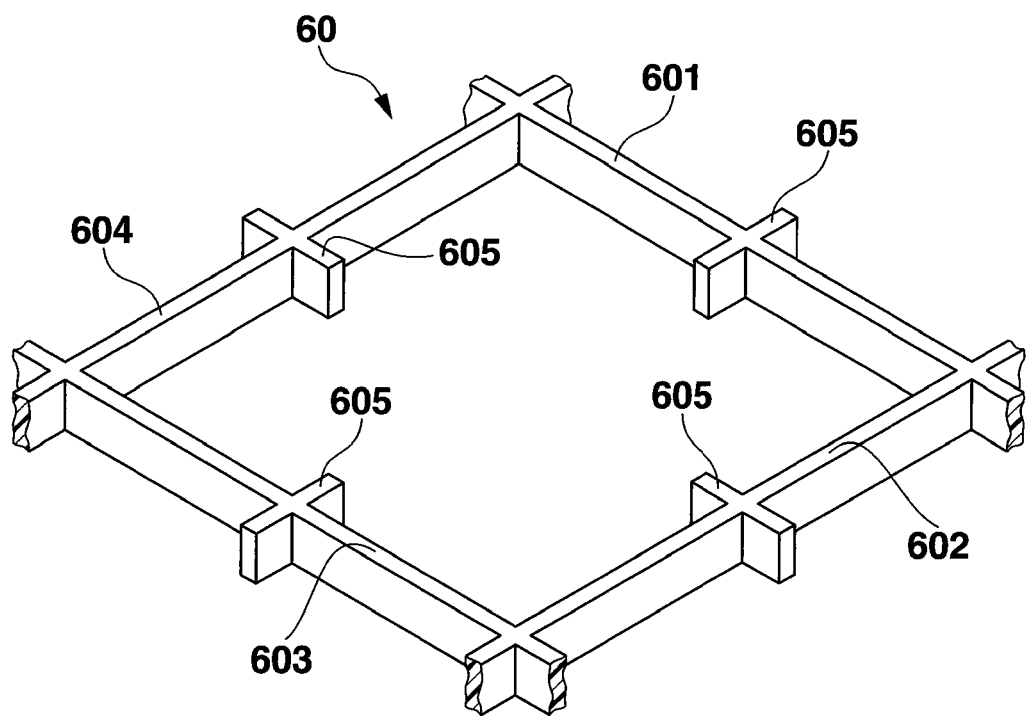
FIG. 4 is a perspective view showing a schematic configuration of an expanded-width portion shown in FIG. 3.

Hereinafter, the partition walls 60 will be described in detail. FIG. 4 is a perspective view showing a schematic configuration of one of the partition walls 60. As shown in FIGS. 3 and 4, each of the partition walls 60 is formed in a rectangular shape so as to surround each of the pixel electrodes 24, and the partition walls 60 are arranged so as to form squares. Each of the partition walls 60 includes four sides 601 to 604, each of which partially has an expanded-width portion 605 wider than other portions of each of the four sides 601 to 604.

The expanded-width portion 605 is formed in approximately the middle of each of the four sides 601 to 604. The expanded-width portion 605 orthogonally crosses each of the four sides 601 to 604 to project therefrom so as to form a cross shape. A width H1 of the expanded-width portion 605 seen from a projecting direction is approximately the same as a width H2 of each of the other parts of each of the four sides 601 to 604.

Next, a sectional structure of the thin film transistor substrate 20 will be described.

As shown in FIG. 2, on an inner surface of the thin film transistor substrate 20 facing the opposite substrate 10, a gate electrode 29 made of Cr (chrome) or the like and the scan lines 22 connected to the gate electrode 29 are formed in predetermined portions. The gate electrode 29 is arranged in a portion in which the thin film transistor 25 is formed. In other predetermined portions on the inner side of the thin film transistor substrate 20, an auxiliary capacity wiring 29a which is made of Cr or the like, and an auxiliary capacity part 26 which is made of ITO (indium tin oxide) or the like and covers the auxiliary capacity wiring 29a are formed. The auxiliary capacity part 26 is formed so as to cover the auxiliary capacity wiring 29a.

In the thin film transistor substrate 20, a gate insulating film 30 made of oxide silicon, nitride silicon or the like is formed so as to cover the gate electrode 29, the scan lines 22, the auxiliary capacity wiring 29a and the auxiliary capacity part 26. By this, the gate electrode 29 is arranged in the lower layer side than the gate insulating film 30.

Above the gate electrode 29, and on an upper surface of the gate insulating film 30, a semiconductor thin film 31 made of a semiconductor such as intrinsic amorphous silicon is formed. In the approximately center of an upper surface of the semiconductor thin film 31, a channel protection film 32 made of oxide silicon, nitride silicon or the like is provided. In the vicinity of both ends of the upper surface of the channel protection film 32, and on the upper surface of the semiconductor thin film 31 which surface is adjacent to the channel protection film 32, ohmic contact layers 33 and 34 made of n+ type amorphous silicon or the like are provided.

On upper surfaces of ohmic contact layers 33 and 34, a source electrode 35 and a drain electrode 36 which are made of Cr or the like are provided. By this, the source electrode 35 and drain electrode 36 are arranged above the upper layer side of the gate insulating film 30. The thin film transistor 25 is an inversely staggered type, and includes the gate electrode 29, the gate insulating film 30, the semiconductor thin film 31, the channel protection film 32, the ohmic contact layers 33 and 34, the source electrode 35 and the drain electrode 36.

Also in areas on the upper surface of the gate insulating film 30 in which the data lines are formed, a semiconductor thin film 37 made of intrinsic amorphous silicon or the like is formed. On an upper surface of the semiconductor thin film 37, an ohmic contact layer 38 made of n+ type amorphous silicon or the like is provided. On an upper surface of the ohmic contact layer 38, a drain film 39 made of Cr or the like is formed. The drain film 39 serves as each of the data lines 23.

On the upper layer side of the thin film transistor 25 and data lines 23, an overcoat film 50 which is an interlayer insulating film made of oxide silicon, nitride silicon or the like is formed so as to cover these thin film transistor 25 and data lines 23. The overcoat film 50 has a contact hole 40 which is formed at a certain position so as to lead to an upper surface of the source electrode 35. More specifically, the contact hole 40 leads to the upper surface of a part of the source electrode 35, which part is spaced apart from the channel protection film 32.

As shown in FIGS. 2 and 3, at a predetermined portion on an upper surface of the overcoat film 50, each of the transparent pixel electrodes 24 made of ITO or the like is formed so as to be electrically connected to the source electrode 35 through the contact hole 40.

On the thin film transistor substrate 20, the partition walls 60, which are provided above the scan lines 22 and data lines 23 and stands toward the opposite substrate 10 from the scan lines 22 and data lines 23, are made of photosensitive resin such as photosensitive acrylic. Each of the partition walls 60 has a cross section formed in a trapezoidal shape, and a bottom portion 60a thereof is formed wider than widths of the lines 22 and 23 so as to cover the scan lines 22 and data lines 23.

Next, a manufacturing method of the electrophoretic display device 1 will be described with reference to FIGS. 5 to 6.

Figure 5A:
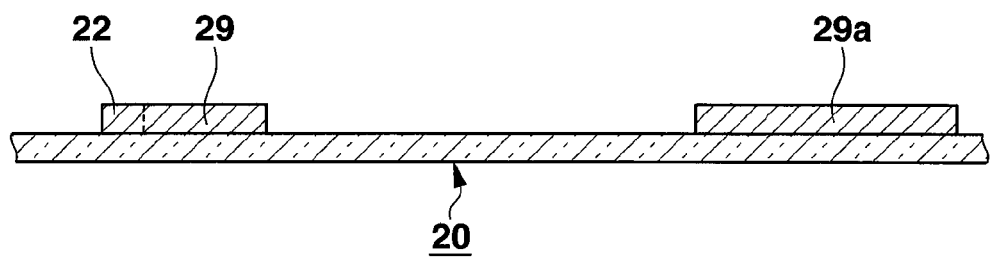
FIGS. 5A-5C are explanatory views each showing a manufacturing procedure of the electrophoretic display device of FIG. 1.

First, as shown in FIG. 5A, a Cr film is formed on the inner surface of the thin film transistor substrate 20 to form the gate electrode 29, scan lines 22 and auxiliary capacity wiring 29a.

Figure 5B:
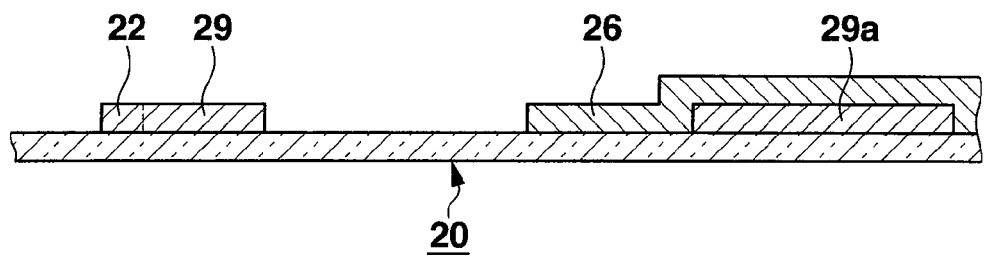

Next, as shown in FIG. 5B, an ITO film is formed so as to cover the auxiliary capacity wiring 29a to form the auxiliary capacity part 26.

Figure 5C:
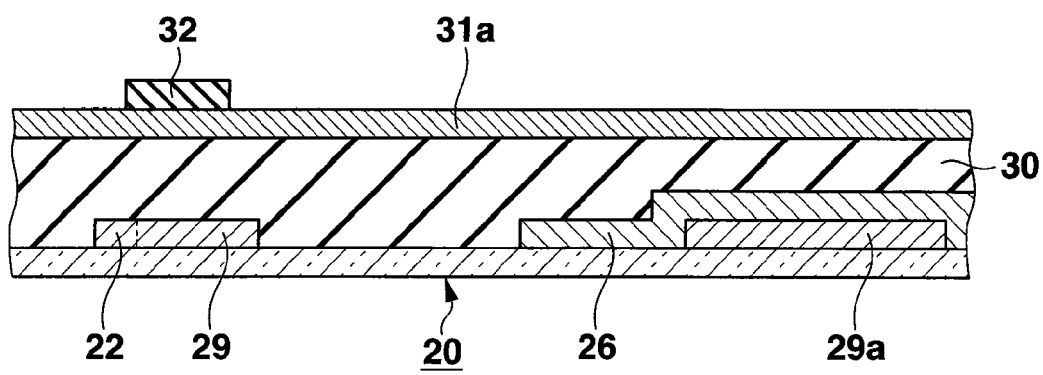

Then, as shown in FIG. 5C, for example, an oxide silicon or nitride silicon film is formed so as to cover the gate electrode 29, the scan lines 22 and the auxiliary capacity part 26 to form the gate insulating film 30. After forming the gate insulating film 30, an intrinsic amorphous silicon 31a is formed on the upper surface of the gate insulating film 30. After forming the intrinsic amorphous silicon 31a, for example, an oxide silicon or a nitride silicon film is formed in a predetermined portion on an upper surface of the intrinsic amorphous silicon 31a to form the channel protection film 32.

Figure 6A:
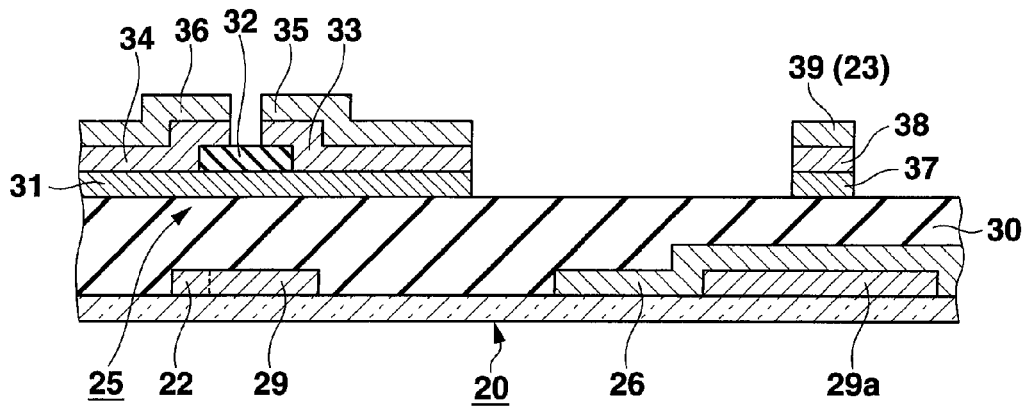
FIGS. 6A-6C are explanatory views each showing a manufacturing procedure of the electrophoretic display device of FIG. 1.

As shown in FIG. 6A, an unnecessary portion of the intrinsic amorphous silicon 31a is removed using, for example, an etching method to form the semiconductor thin films 31 and 37. After removal, an n+ amorphous silicon film or the like is formed in a predetermined portion to form the ohmic contact layers 33, 34 and 38, and a Cr film is formed on the ohmic contact layers 33, 34 and 38 to form the source electrode 35, drain electrode 36 and drain film 39. By this, the thin film transistor 25 and data lines 23 are formed.

Figure 6B:
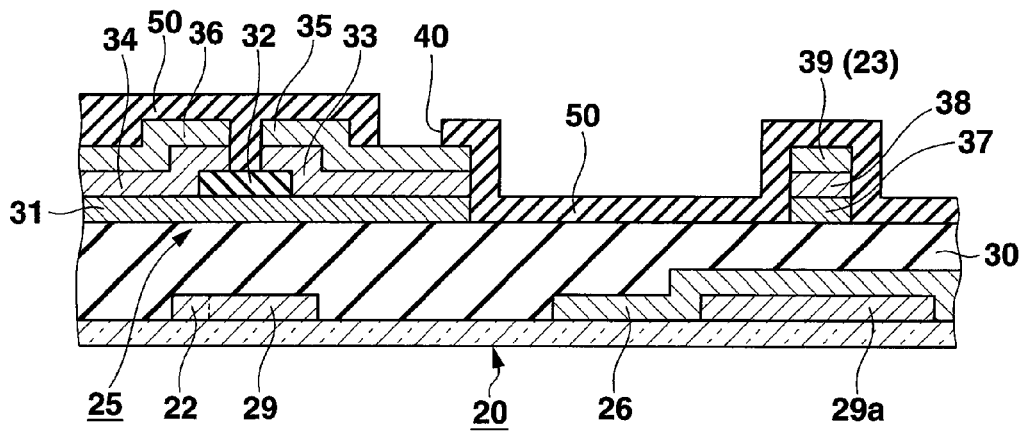

As shown in FIG. 6B, for example, an oxide silicon or nitride silicon is formed on the upper layer side of the thin film transistor 25 and data lines 23 to form the overcoat film 50. Then, a predetermined portion of the overcoat film 50 is removed by a known etching method to form the contact hole 40.

Figure 6C:
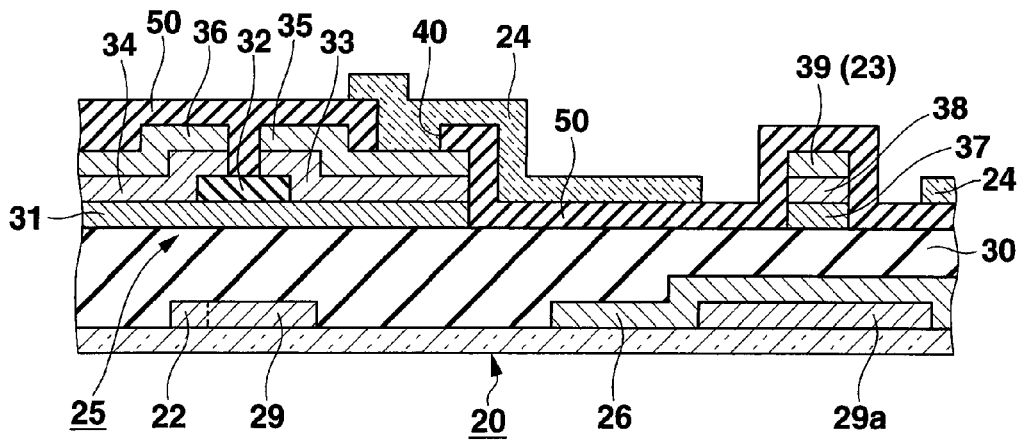

Then, as shown in FIG. 6C, an ITO film is formed on a predetermined portion on the upper surface of the overcoat film 50 to form the pixel electrodes 24.

Figure 7:
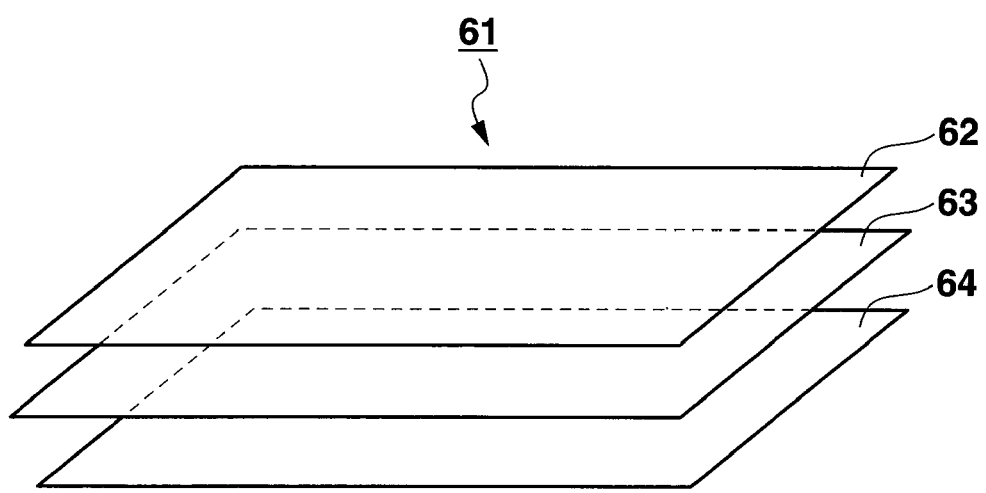
FIG. 7 is an exploded perspective view showing a schematic configuration of partition wall films for forming a partition wall provided in the electrophoretic display device of FIG. 1.
Figure 8:
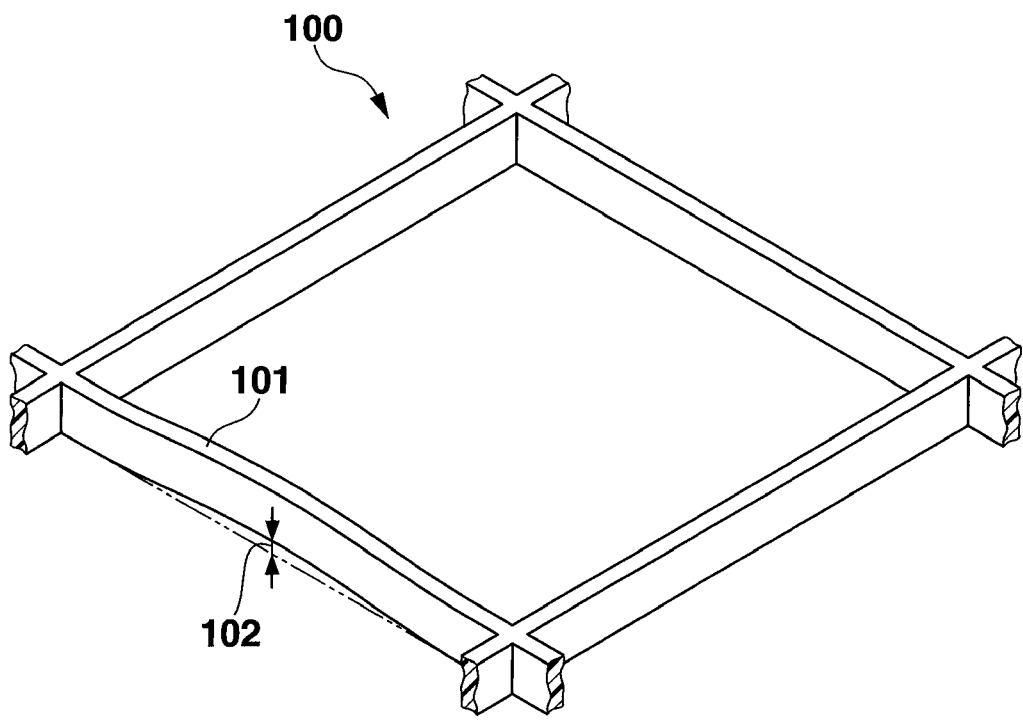
FIG. 8 is a perspective view schematically showing detachment of a partition wall provided in a conventional electrophoretic display device.

When the thin film transistor substrate 20 is made, the partition walls 60 are formed on the thin film transistor substrate 20. More specifically, the partition walls 60 are formed using a partition wall film 61 shown in FIG. 7. Although respective layers are detached from each other in FIG. 7, the partition wall film 61 is actually formed by stacking a support film 62, a resist film 63 and a cover film 64 in layers. The support film 62 is made of resin film such as PET, and the cover film 64 is made of a resin film such as OPP, for example. The resist film 63 is made of a photosensitive resin such as photosensitive acrylic forming the partition walls 60, and the support film 62 is pasted on one surface of the resist film 63 and the cover film 64 is pasted on the other surface.

To form the partition walls 60 using the partition wall film 61, the cover film 64 is first peeled off and the resist film 63 is pasted on the thin film transistor substrate 20. The resist film 63 is exposed in this state, and the photosensitive acrylic is transferred to a predetermined position of the thin film transistor substrate 20. After the photosensitive acrylic is transferred, the support film 62 is peeled off, then the resist film 63 is developed and portions other than portions transferred to the thin film transistor substrate 20 are removed. Then, by applying post-baking to the photosensitive acrylic transferred on the thin film transistor substrate 20 and thereby increasing adherence, the partition walls 60 are formed as shown in FIG. 2.

After the partition walls 60 are formed, the solvent 70 in which the black particles 71 and the white particles 72 are dispersed is injected in a plurality of spaces surrounded by the partition walls 60. After injection, the opposite substrate 10 is arranged above the thin film transistor substrate 20 such that the opposite electrode 11 and pixel electrodes 24 face each other, and sealing is executed by sticking the substrates 10 and 20 which face each other with the frame-shaped sealing material (not shown) to be formed between the substrates 10 and 20. Instead, it is also possible to form in advance an adhering layer using, for example, a resin film on an entire surface of the opposite substrate 10 to paste and seal the substrates 10 and 20 (see FIG. 1.)

Next, a function of the electrophoretic display device 1 according to the present embodiment will be described. In the electrophoretic display device 1, the display surface is an outer surface 20a of the thin film transistor substrate 20 and the viewing direction is the arrow direction in FIG. 1.

When a voltage of the opposite electrode 11 is increased greater than the pixel electrodes 24, the white particles 72 made of negatively-charged oxide titanium move toward the opposite electrode 11 and the black particles 71 made of positively-charged carbon black move toward the pixel electrodes 24, thereby displaying black on the display surface (for example, a state shown in FIG. 1). By contrast with this, when the voltage of the opposite electrode 11 is decreased lower than the electrode pixels 24, the white particles 72 move toward the pixel electrodes 24 and the black particles 71 move toward the opposite electrode 11, thereby displaying white on the display surface. By so doing per pixel arranged in a matrix shape, a predetermined figure or text is drawn on the display surface.

As described above, according to the present embodiment, the part of each of the four sides 601 to 604 of each of the partition walls 60 is made to be the expanded-width portion 605 wider than the other portions, so that the expanded-width portion 605 adhere to each of the pixel electrodes 24 and, consequently, it is possible to expand the adhering area. In this case, a decrease of the opening ratio is less than a case where the widths of the entire partition walls 60 are uniformly expanded. Consequently, it is possible to prevent detachment or distortion of the partition walls 60 while suppressing a decrease of the opening ratio.

Moreover, the expanded-width portion 605 is formed in the approximately middle of each of the four sides 601 to 604, so that it is possible to increase reliability of adherence at the middle where the partition walls 60 are more likely to be detached.

Furthermore, the width H1 of the expanded-width portion 605 seen from the projecting direction is approximately the same as the width H2 of the other portions of the four sides 601 to 604, so that it is possible to easily determine the exposure condition and development condition of the resist film 63.

In addition, the present invention is by no means limited to this and can be adequately changed.

For example, although a case has been described with the present embodiment where the expanded-width portion 605 is provided in each of the four sides 601 to 604 forming one partition wall 60, the expanded wall 605 only needs to be provided in at least one of the sides 601 to 604.

Moreover, although a case has been described with the present embodiment where each side 601 and expanded-width portion 605 form a cross shape, the shape of the expanded-width portion 605 is by no means limited to this, and may be formed in other shapes such as a polygonal shape or circular shape.

Furthermore, although a case has been described with the present embodiment where the expanded-width portion 605 is provided in the middle of each of the sides 601 to 604, the expanded-width portion 605 may be provided at any point of each side part 601 to 604. For example, the expanded-width portions 605 may be arranged at two points which divide each of the sides 601 to 604 into three.

What is claimed is:

1. An electrophoretic display device comprising:
   a first substrate and a second substrate which are arranged opposite to each other at a predetermined interval;
   a plurality of pixel electrodes which are aligned on the first substrate;
   a wiring which is arranged between adjacent pixel electrodes among the pixel electrodes;
   an opposite electrode which is provided on the second substrate;
   a partition wall which is provided above the wiring of the first substrate to stand toward the second substrate so as to surround the pixel electrodes; and
   a solvent which fills up a space surrounded by the partition wall and in which a plurality of particles are dispersed;
   wherein the partition wall has a rectangular shape including four sides, at least one of which partially has an expanded-width portion wider than other portion of the at least one of the four sides.

2. The electrophoretic display device according to claim 1, wherein the expanded-width portion is formed in an approximately middle of the at least one of the four sides.

3. The electrophoretic display device according to claim 1, wherein
   the expanded-width portion orthogonally crosses the at least one of the fourth sides to project so as to form a cross shape, and
   a width of the expanded-width portion seen from the projection direction is approximately the same as a width of the other portion of the at least one of the four sides.

4. The electrophoretic display device according to claim 1, wherein a cross section of the partition wall has a trapezoidal shape.

5. The electrophoretic display device according to claim 1, wherein a bottom portion of the partition wall covers the wiring.

6. The electrophoretic display device according to claim 1, wherein the partition wall is made of photosensitive resin.

7. The electrophoretic display device according to claim 1, wherein a width of the partition wall is set to a value within a range between about 10 μm and about 40 μm.

8. The electrophoretic display device according to claim 1, wherein a height of the partition wall is set to a value within a range between about 10 μm and about 40 μm.

* * * * *